| United States Patent [19] | [11] | Patent Number: | 4,489,099 |
|---|---|---|---|
| Shaheen et al. | [45] | Date of Patent: | Dec. 18, 1984 |

[54] VITAMIN E/DLTDP STABILIZER SYSTEM FOR CHEWING GUM SBR

[75] Inventors: Frank G. Shaheen, North Canton; Jerry J. Dillon, Akron, both of Ohio

[73] Assignee: The Goodyear Tire & Rubber Company, Akron, Ohio

[21] Appl. No.: 470,037

[22] Filed: Feb. 28, 1983

[51] Int. Cl.$^3$ .............................................. A23G 3/30
[52] U.S. Cl. ............................................ 426/3; 426/6; 426/541; 426/544; 426/545; 426/546; 426/271
[58] Field of Search ......................................... 426/3–6, 426/541, 544, 545, 546, 271

[56] References Cited

U.S. PATENT DOCUMENTS

| 2,333,656 | 11/1943 | Mattil et al. | 426/545 |
| 3,424,821 | 1/1969 | Hunter | 426/546 |
| 3,573,936 | 4/1971 | Karchmar | 426/546 |
| 3,721,704 | 3/1973 | Dexter | 426/546 |
| 4,044,160 | 8/1977 | Erickson et al. | 426/546 |
| 4,054,676 | 10/1977 | Weinshenker et al. | 426/546 |
| 4,233,288 | 11/1980 | Cornell | 426/6 |
| 4,378,374 | 3/1983 | Reggio | 426/6 |

*Primary Examiner*—Jeanette Hunter
*Attorney, Agent, or Firm*—Alvin T. Rockhill

[57] ABSTRACT

Styrene butadiene rubber (SBR) is widely used as a chewing gum base in lieu of natural gums. It is necessary to protect chewing gum SBR with a food grade antioxidant stabilizer system. This invention discloses a chewing gum rubber composition (gum base) that utilizes as an antioxidant stabilizer system a combination of dilauryl thiodipropionate and at least one member selected from the group consisting of t-butyl-hydroquinone (TBHQ), and Vitamin E.

15 Claims, No Drawings

VITAMIN E/DLTDP STABILIZER SYSTEM FOR CHEWING GUM SBR

BACKGROUND OF THE INVENTION

Today ordinary chewing gums and bubble gums generally utilize as their gum base one or a combination of two or more natural or snythetic elastomers. Styrene butadiene rubber (SBR) is a synthetic elastomer that is widely used as a gum base in chewing gums. The gum base that is selected provides the chewing gum with its masticatory properties. A chewing gum base is normally admixed with sugars or synthetic sweeteners, perfumes, flavors, plasticizers, and fillers; and then milled and formed into sticks, sheets, or pellets. Cottonseed oil is sometimes also added to give the gum softness.

When SBR is utilized as a chewing gum base it is necessary that some stabilizer be added so that the gum can be processed and provided with necessary antioxidant protection. In the absence of such a stabilizer it would be impossible to process the SBR chewing gum base into chewing gum. If an attempt to process an SBR gum base into chewing gum in the absence of a stabilizer is made there is a very substantial likelihood that the gum base will catch on fire. Normally, butylated hydroxy toluene (BHT) is added to the chewing gum SBR as a stabilizer. BHT is widely used as an antioxidant in food products and in animal feed. However, there is a growing belief that the ingestion of BHT is hazardous to human health.

Replacing BHT with "natural" stabilizers or those that are generally recognized as being safe would be highly desirable. This invention reveals an SBR stabilizer system that would generally be considered to be safe.

SUMMARY OF THE INVENTION

This invention discloses an improved chewing gum rubber composition comprising: (1) styrene-butadiene rubber and (2) as a stabilizing system a combination of (a) dilauryl thiodipropionate (DLTDP) and (b) at least one member selected from the group consisting of Vitamin E and t-butyl-hydroquinone. This chewing gum rubber composition can then be used as a gum base in the manufacture of chewing gum. Combinations of Vitamin E and DLTDP have proven to be an excellent choice as the stabilizing system for chewing gum SBR. Combinations of Vitamin E and DLTDP can provide SBR with properties that are comparable to those provided by BHT which is commonly used to stabilize chewing gum SBR. Since BHT is under attack as being hazardous to human health it would be highly desirable to replace it with compounds that are generally recognized as being safe,, such as those described in this invention. The use of Vitamin E as a component in such a stabilizer system is particularly desirable since it has been touted as being effective in the prophylaxis of certain diseases. This invention also reveals, a chewing gum, which comprises an SBR which is stabilized with dilauryl thiodipropionate (DLTDP) and at least one member selected from the group consisting of Vitamin E and t-butyl hydroquinone (TBHQ) as a gum base, in addition to other chewing gum additives including sweeteners, softeners, and flavors.

DETAILED DESCRIPTION OF THE INVENTION

This invention reveals a stabilizer system for chewing gum SBR that employs DLTDP as one of its components. This stabilizer system protects the rubber during processing and provides it with adequate antioxidant protection. The improved chewing gum rubber compositions disclosed in this invention comprise styrene-butadiene rubber and a stabilizer system that utilizes DLTDP as one of its components. These chewing gum rubber compositions can then be used with excellent results as the gum base in the production of chewing gum. The improved chewing gum rubber compositions of this invention will be employed in conjunction with other chewing gum ingredients (additives) to form chewing gum.

Chewing gum may be formed by adding these chewing gum ingredients to the unique chewing gum rubber compositions described herein according to accepted conventional chewing gum making techniques. Generally, such chewing gum will contain from about 10 percent to about 50 percent, and preferably from about 15 percent to about 30 percent by weight of the unique chewing gum rubber compositions of this invention and will also include from about 50 percent to about 90 percent, and preferably from about 70 percent to about 85 percent by weight of other chewing gum ingredients including one or more sweeteners, flavoring materials, coloring agents, wetting agents, fillers, and the like.

The chewing gum can contain one or more natural or synthetic sweeteners. Chewing gum normally contains a sugar in an amount of from about 20 to about 80 percent by weight, and preferably, from about 25 to about 40 percent by weight. The chewing gum may include a sugar alcohol, in lieu of or in addition to the sugar, such as sorbitol, arabitol, mannitol or xylitol; the sugar alcohol may be present in an amount within the range of from about 2 to about 15 percent by weight, and preferably, from about 5 to about 12 percent by weight. Where an artificial sweetener is employed such as, for example, aspartame, cyclamate, or a saccharin or other sweetener as set out hereinafter, the artificial sweetener may be present in an amount of from 0 to about 0.5 percent by weight and preferably, from about 0.05 to about 0.2 percent by weight.

Examples of sugars which may be employed herein include, for example, monosaccharides of 5 or 6 carbon atoms, such as arabinose, xylose, ribose, glucose, mannose, galactose, fructose, dextrose, or sorbose or mixtures of two or more of the foregoing monosaccharides, disaccharides, for example, sucrose such as cane or beet sugar, lactose, maltose or cellobiose; polysaccharides, such as partially hydrolyzed starch or dextrin.

Examples of artificial sweeteners which may be employed herein include sodium, calcium or ammonium saccharin salts, free saccharin and, dihydrochalcones, glycyrrhizin, dipotassium glycyrrhizin, glycyrrhizic acid ammmonium salt, L-aspartyl-L-phenylalanine methyl ester (aspartame), the sodium or potassium salt of 3,4-dihydro-6-methyl-1,2,3-oxathiazine-4-one-2,2-dioxide (Ace-sulfame-K), as well as Stevia rebaudiana (Stevioside), Richardella dulcifica (Miracle Berry), Diascoreophyllum cumminsii (Serendipity Berry), cyclamate salts, and the like, or mixtures of any two or more of the above.

The chewing gum can also include flavoring, such as sour or fruit flavoring or nonacid or mint flavoring in an amount ranging from about 0.3 to about 2.0 percent by weight, and preferably from about 0.5 to about 1.2 percent by weight of the final gum product. The flavoring may comprise synthetic flavors and oils derived from plants, leaves, flowers, fruit, etc. Representative flavor oils which may be also be employed in the chewing gum of this invention include acids such as adipic, succinic and fumaric acids, citrus oils such as lemon oil, orange oil, lime oil, grapefruit oil, fruit essences such as apple essence, pear essence, peach essence, strawberry essence, apricot essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil fo bitter almonds, cassia oil and methylsalicylate (oil of wintergreen).

The chewing gum can also contain conventinal ester gums, polydextrose, fillers, such as calcium carbonate, and talc and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D.& C. coloring agents, and other conventional chewing gum additives as will be apparent to those skilled in the art.

The stabilizer systems that are useful in this invention include combinations of DLTDP and at least one member selected from the group consisting of t-butylhydroquinone (TBHQ) and Vitamin E (5,7,8-trimethyltocol). Vitamin E is also known as the dl-Alpha Tocopherol which has the structural formula:

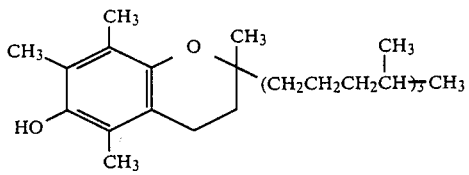

When this stabilizer system is distributed (mixed) throughout chewing gum SBR it provides the rubber with adequate stability to be processed and with satisfactory antioxidant protection. The stabilizing systems disclosed in this invention can be distributed throughout SBR using a variety of techniques known to those skilled in the art. The preferred means of distributing this stabilizer system throughout chewing gum SBR is by emulsifying it with a food grade emulsifier and adding the emulsion to the SBR latex. The latex can then be coagulated using a standard salt-acid coagulation system known to those skilled in the art. The chewing gum SBR composition which contains this stabilizing agent can then be processed into chewing gum using standard techniques.

The emulsifier used in this invention should be suitable for emulsifying the stabilizing agent. A number of food grade emulsifiers are satisfactory for this purpose. Saponified fatty acids can be used for this purpose. Oleic acid (cis-9-octadecenoic acid) which has been saponified with potassium hydroxide is preferred for use as the emulsifier in this invention. Oleic acid should be protected from both air and light since on exposure to air, especially when impure, it oxidizes and acquires a yellow to brown color and rancid odor.

A combination of Vitamin E and DLTDP is an excellent choice as the stabilizing system for chewing gum SBR. Neither Vitamin E nor DLTDP alone will satisfactorily stabilize chewing gum SBR. However, a mixture of the two will provide the SBR with properties that are comparable to those provided by BHT. The use of DLTDP alone will cause an increase in Mooney torque as a function of time. The use of Vitamin E alone as the stabilizer will cause a decrease in Mooney torque as a function of time. It is highly desirable for the Mooney torque of the SBR rubber being utilized in chewing gum to remain constant with the passage of time. BHT has a very insignificant effect on Mooney torque with a very slight decrease in torque being observed with the passage of time. A combination of Vitamin E and DLTDP containing optimum amounts of both of these components can be employed as a stabilizing agent which provides SBR with adequate antioxidant protection and sufficient stability for processing while maintaining a Mooney torque which is essentially unaffected by the passage of time.

The optimum combination of DLTDP and Vitamin E that should be used in chewing gum SBR as the stabilizing agent has been determined. The optimum ratio of DLTDP to Vitamin E has been determined to be about 1.7 for use as a stabilizing system in chewing gum SBR. The amount of DLTDP and Vitamin E that is generally added to a chewing gum SBR latex as the stabilizing system generally is 0.08 to 0.60 phr (parts per hundred parts of dry rubber) and 0.05 to 0.40 phr, respectively. The preferred amounts of DLTDP and Vitamin E that can be added to the latex are 0.25 to 0.45 phr and 0.10 to 0.30 phr, respectively. It is most preferred for this stabilizing system to be a combination of from 0.32 to 0.36 phr of DLTDP and from 0.18 to 0.25 phr of Vitamin E.

It is important to add freshly emulsified DLTDP to the latex because the DLTDP can hydrolyze in an aqueous form. DLTDP can be dissolved in Vitamin E at a temperature of about 45° C. at a ratio of DLTDP to Vitamin E of 1.75 and then both of these components of the stabilizing system can be emulsified together. It is desirable for the emulsion formed to be neutral. Special care must be taken with Vitamin E and it should be stored under nitrogen because it is inherently unstable in the presence of oxygen, high temperatures, and alkalai.

The use of t-butyl hydroquinone (TBHQ) alone will not be satisfactory to stabilize chewing gum rubber compositions for use as a chewing gum base in the manufacture of chewing gum. However, mixtures of TBHQ and DLTDP can adequately provide SBR chewing gum rubber compositions with sufficient stability to be processed into chewing gum.

The optimum ratio of TBHQ to DLTDP for use as the stabilizing systen in chewing gum rubber compositions has been determined to be about 5:1. The amount of TBHQ and DLTDP that is generally added to a chewing gum SBR latex as the stabilizing system is about 0.10 to 0.50 phr and about 0.02 to 0.20 phr, respectively. It is preferred for this stabilizing system to be a combination of from 0.20 phr to 0.30 phr of TBHQ and from 0.03 to 0.07 phr of DLTDP. It is most preferred for the stabilizing system to be a combination of about 0.25 phr of TBHQ and about 0.05 phr of DLTDP.

It should be noted that combinations of DLTDP, TBHQ, and Vitamin E can be employed very effectively as the stabilizing system in chewing gum rubber compositions.

DESCRIPTION OF THE PREFERRED EMBODIMENTS

This invention is illustrated by the following examples which are merely for the purpose of illustration and are not to be regarded as limiting the scope of the invention or manner in which it may be practiced. Unless specifically indicated otherwise, parts and percentages are given by weight. Mooney viscosity values (ML-4) were determined using ASTM procedure D-1646.

The following examples show the stability that can be attained by employing various stabilizer systems in SBR. In these examples, the Mooney viscosities that were determined are very indicative of the stability that was achieved. Aged Mooney viscosity determinations which are given in the following examples, are the most important experimental test for stability in chewing gum rubber compositions. It is very desirable and indicative of good stability for aged Mooney viscosities to be essentially the same as the original Mooney viscosity of a chewing gum rubber composition that will be used as a chewing gum base.

EXAMPLES 1 THROUGH 8

Various mixtures of DLTDP and Vitamin E were prepared by melting the DLTDP in the Vitamin E at 45° C. These mixtures were then emulsified by adding 4.25 g of food grade oleic acid to 137.5 g of the various DLTDP/Vitamin E mixtures. 0.94 g of KOH was dissolved in 132.3 g of water at 40° C.-45° C. and the aqueous KOH solution formed was slowly added to the DLTDP/Vitamin E/oleic acid blend with sufficient agitation to form a 50 percent active stable emulsion. These emulsified combinations of Vitamin E and DLTDP were added to a series of bottles containing a latex which after coagulation is sold by The Goodyear Tire & Rubber Company as a dry rubber (Plioflex TM 1027). Plioflex TM 1027 is an SBR commonly used as a gum base in the manufacture of chewing gum, which contains about 22 to 25 weight percent bound styrene, and has a solids content of about 22 weight percent. The amount of Vitamin E and DLTDP added to each of the latex samples in parts per hundred parts of dry rubber (phr) is given in Table I.

These latex samples were coagulated using a standard salt-acid coagulation system. More specifically, the latex samples were coagulated by adding 100 g of a 20 percent aqueous NaCl solution to them per 100 g of dry rubber in the latex. A 2 percent aqueous sulfuric acid ($H_2SO_4$) solution was then slowly added to the latex at 150° F. (66° C.) to 160° F. (71° C.) with aggitation until the pH of the solution was reduced to 4. After coagulation, the polymers were oven dried for 16 hours at 158° F. (70° C.). The original Mooney viscosity of these gum samples was then determined at 212° F. (100° C.) This series of gum samples was then aged in a circulation air oven at 70° C. for a period of 2 weeks with aged Mooney viscosity being determined for each of the samples after three days, five days, seven days, and fourteen days. The Mooney ML-4 values for each of the gum samples in this series is shown in Table I. It is very desirable for aged Mooney viscosities to be essentially the same as the original Mooney viscosity of a SBR that will be used as a chewing gum base.

TABLE I

| Example | Vitamin E Added, phr | DLTDP Added, phr | Mooney, ML-4 original | 3 days | 5 days | 7 days | 14 days |
|---|---|---|---|---|---|---|---|
| 1 | 0.25 | 0.20 | 53 | 41 | 38 | 26 | 24 |
| 2 | 0.20 | 0.30 | 56 | 46 | 44 | 41 | 37 |
| 3 | 0.10 | 0.30 | 55 | 54 | 50 | 50 | 47 |
| 4 | 0.05 | 0.20 | 58 | 53 | 50 | 46 | 43 |
| 5 | 0.10 | 0.10 | 57 | 55 | 54 | 52 | 49 |
| 6 | 0.20 | 0.10 | 57 | 50 | 51 | 45 | 42 |
| 7 | 0.15 | 0.20 | 52 | 37 | 29 | 32 | 63 |
| 8 | 0.15 | 0.20 | 54 | 41 | 33 | 32 | 47 |

As can be determined by examining Table I, aged Mooney, ML-4 values can be controlled by adding the appropriate amount of both Vitamin E and DLTDP to the latex being treated.

EXAMPLE NO. 9

The same procedure that was used in Examples 1 through 8 was employed here except that 0.3 phr of BHT was added to the latex in lieu of the Vitamin E/DLTDP combination as the stabilizing system. The Mooney values for this gum sample that was treated with BHT are given in Table II.

TABLE II

| Example | BHT, phr | Mooney, ML-4 Original | 3 days | 5 days | 7 days | 14 days |
|---|---|---|---|---|---|---|
| 9 | 0.3 | 53 | 49 | 53 | 50 | 53 |

This experiment was conducted to show the Mooney viscosities that are observed when BHT, which is generally used in the art today, is employed as the stabilizer. As can be seen in Table II, aged Mooney visocisities are essentially the same as the original Mooney viscosity when 0.3 phr of BHT is employed as the stabilizer.

EXAMPLES 10 AND 11

The same procedure that was employed in Examples 1 through 8 was used here except that in Example 10 only DLTDP was added as the stabilizing agent and in Example 11 only Vitamin E was added as the stabilizing agent.

TABLE III

| Example | Vitamin E Added, phr | DLTDP Added, phr | Mooney, ML-4 original | 3 days | 5 days | 7 days | 14 days |
|---|---|---|---|---|---|---|---|
| 10 | 0.0 | 0.3 | 86 | 115 | 120 | 123 | 132 |
| 11 | 0.3 | 0.0 | 61 | 38 | 24 | 25 | 23 |

As can be determined by examining Table III when DLTDP is used alone as the stabilizing agent Mooney ML-4 increases with the passage of time. It can also be seen that when Vitamin E is used alone as the stabilizing agent that Mooney values decrease with the passage of time. These examples show that neither Vitamin E nor DLTDP alone will satisfactorily stabilize chewing gum rubber compositions (chewing gum bases).

Since Vitamin E causes Mooney to decrease with time and DLTDP causes Mooney to increase with the passage of time, the proper combination of Vitamin E and DLTDP will cause Mooney values to remain essentially constant with the passage of time.

EXAMPLE 12

The same procedure that was employed in Examples 1 through 8 was used in this experiment except that only 0.30 phr of TBHQ was employed as the stabilizing system. The original and aged Mooney viscosities that were determined are given in Table IV.

TABLE IV

| Aging Time | Mooney Viscosity (ML-4) |
| --- | --- |
| Original | 63 |
| 3 days | 55 |
| 5 days | 49 |
| 7 days | 46 |
| 14 days | 33 |

As can be determined by examining Table IV, TBHQ cannot be used alone to stabilize chewing gum rubber compositions. The use of TBHQ alone as a stabilizing system caused Mooney viscosity to decrease constantly over the 2 week aging period.

EXAMPLE 13

The same procedure that was specified in Examples 1 through 8 was used in this experiment, except that a combination of 0.25 phr of t-butyl-hydroquinone (TBHQ), and 0.05 phr of dilauryl thiodipropionate (DLTDP) was added to the SBR latex sample. The original and aged Mooney viscosities of this SBR are given in Table V.

TABLE V

| Aging Time | Mooney Viscosity (ML-4) |
| --- | --- |
| Original | 67.0 |
| 3 days | 67.0 |
| 5 days | 67.0 |
| 7 days | 67.0 |
| 14 days | 67.0 |

As can be determined by examining Table V, this combination of TBHQ, and DLTDP was very outstanding for providing the chewing gum rubber composition with stability. This stabilizing system was so good that Mooney viscosities did not change at all on aging at 70° C. over a period of 2 weeks. The TBHQ did cause this chewing gum rubber composition to be purple in color and this may be an added benefit if a purple chewing gum is desired, as far example, in grape chewing gum.

While certain repesentative embodiments and details have been shown for the purpose of illustrating the invention, it will be apparent to those skilled in this art that various changes and modifications may be made therein without departing from the scope of the invention.

What is claimed is:

1. An improved chewing gum rubber composition comprising: (1) styrene-butadiene rubber and (2) as a Mooney viscosity stabilizing system a combination of (a) 0.08 to 0.60 phr of dilauryl thiodipropionate and (b) 0.05 to 0.4 phr of Vitamin E wherein said chewing gum rubber composition has an aged Mooney ML-4 viscosity which is essentially the same as the original Mooney ML-4 viscosity of said chewing gum rubber composition wherein the aged Mooney ML-4 viscosity and the original Mooney ML-4 viscosity are determined using ASTM procedure D-1646.

2. A composition as specified in claim 1 wherein said stabilizing system is a combination of from 0.25 to 0.45 phr of dilauryl thiodipropionate and from 0.1 to 0.3 phr of Vitamin E.

3. A composition as specified in claim 2 wherein said stabilizing system is a combination of from 0.32 to 0.36 phr of dilauryl thiodipropionate and from 0.18 to 0.25 phr of Vitamin E.

4. A composition as specified in claim 1 wherein the ratio of said dilauryl thiodipropionate to said Vitamin E is about 1.7.

5. A composition as specified in claim 1 wherein said dilauryl thiodipropionate is emulsified in a food grade emulsifier.

6. A composition as specified in claim 5 wherein said food grade emulsifier is a combination of oleic acid and potassium hydroxide.

7. A chewing gum which comprises: a SBR which is Mooney viscosity stabilized with 0.08 to 0.60 phr of dilauryl thiodipropionate and 0.05 to 0.4 phr of Vitamin E as a gum base wherein said gum base has an aged Mooney ML-4 viscosity which is essentially the same as the original Mooney ML-4 viscosity of said gum base wherein the aged Mooney ML-4 viscosity and the original Mooney ML-4 viscosity are determined using ASTM procedure D-1646, in addition to other chewing gum additives including sweeteners, softeners, and flavors.

8. A chewing gum as specified in claim 7 wherein said SBR is stabilized with a combination of from 0.25 to 0.45 phr of dilauryl thiodipropionate and from 0.1 to 0.3 phr of Vitamin E.

9. A chewing gum as specified in claim 8 wherein said SBR is stabilized with a combination of from 0.32 to 0.36 phr of dilauryl thiodipropionate and from 0.18 to 0.25 phr of Vitamin E.

10. An improved chewing gum rubber composition comprising: (1) styrene-butadiene rubber and (2) as a Mooney viscosity stabilizing system a combination of (a) 0.02 to 0.20 phr of dilauryl thiodipropionate and (b) 0.10 to 0.50 phr of t-butyl hydroquinone, wherein said chewing gum rubber composition has an aged Mooney ML-4 viscosity which is essentially the same as the original Mooney ML-4 viscosity of said chewing gum rubber composition wherein the aged Mooney ML-4 viscosity and original Mooney ML-4 viscosity are determined using ASTM procedure D-1646.

11. A composition as specified in claim 10 wherein said stabilizer system is a combination of from 0.03 to 0.07 phr of dilauryl thiodipropionate and from 0.20 to 0.30 phr of t-butyl hydroquinone.

12. A composition as specified in claim 11 wherein said stabilizing system is a combination of about 0.05 phr of dilauryl thiodipropionate and about 0.25 phr of t-butyl hydroquinone.

13. A composition as specified in claim 11 wherein said dilauryl thiodipropionate is emulsified in a food grade emulsifier.

14. A composition as specified in claim 13 wherein said food grade emulsifier is a combination of oleic acid and potassium hydroxide.

15. A composition as specified in claim 10 wherein the ratio of said t-butyl hydroquinone to said dilauryl thiodipropionate is about 5:1.

* * * * *